United States Patent [19]
Rhie et al.

[11] Patent Number: 5,953,392
[45] Date of Patent: Sep. 14, 1999

[54] METHOD AND APPARATUS FOR TELEPHONICALLY ACCESSING AND NAVIGATING THE INTERNET

[75] Inventors: Kyung H. Rhie, Los Altos; Richard J. Kwan, Fremont; Lee E. Olsen, Boulder Creek; John S. Hahn, Los Altos, all of Calif.

[73] Assignee: Netphonic Communications, Inc., Mountain View, Calif.

[21] Appl. No.: 08/609,699

[22] Filed: Mar. 1, 1996

[51] Int. Cl.[6] ..................................................... A04M 1/64
[52] U.S. Cl. .................................. 379/88.13; 379/88.14; 379/88.17; 379/88.24; 704/271; 395/200.49
[58] Field of Search ................................. 379/67, 88, 89, 379/93, 100, 67.1, 88.01, 88.02, 88.03, 88.04, 88.13, 88.17, 88.18, 88.14, 88.24; 395/2.79, 2.8, 2.67, 200.47, 200.48, 200.49; 707/501; 704/270, 271, 290

[56] References Cited

U.S. PATENT DOCUMENTS

| | | | |
|---|---|---|---|
| 4,653,100 | 3/1987 | Barnett et al. | 381/52 |
| 4,716,583 | 12/1987 | Groner et al. | 379/94 |
| 4,974,254 | 11/1990 | Perine et al. | 379/100 |
| 5,136,634 | 8/1992 | Rae et al. | 379/100 |
| 5,351,276 | 9/1994 | Doll, Jr. et al. | 379/67 |

OTHER PUBLICATIONS

Makoto, "TNG PhoneShell (part 2). A proposal and an implimentation of internet access method with telephones and facsimilies", JICST abstract 96A0053311, May 1995.

Groner, "The telephone—the ultimate terminal", Telphony, pp. 34–40, Jun. 1984.

Arita et al., "The Voice Browser—an Archetype–Based Dialog Model", NEC Res & Develop., vol. 36 No. 4. pp. 554–561, Oct. 1995.

Hemphill et al., "(Surfing the Web by Voice", ACM 0–89791–751–0–95/11 pp. 215–222, Nov. 1995.

Christodoulakis et al. "The Multimedia Object Presentation Manager of MINOS: A symmetric approach", SIGMOD vol. 15 No. 2 pp. 295–310, Jun. 1986.

Zue, "Navigating the Information Superhighway Using Spoken Language Interfaces" IEEE Expert pp. 39–43, Oct. 1995.

Caldwell et al., "Project Echo—Telephonic Browser for the WWW", <http:www.cc.gatech.edu/people/home/tgay/echo.html> Apr. 15, 1997, undated.

James, "Presenting HTML Structure in Audio: User Satisfaction with Audio Hypertext", <http://www–pcd.stanford.edu/~fjames/reports/pilot–tr/techrep–pilot.html> Apr. 14, 1997, undated.

James, "AHA:Audio HTML Access" <http://www–pcd.stanford.edu/~fjames/aha/www6/PAPER296.htmll Apr. 14, 1997>, undated.

Novick et al., "A multimodal browser for the World–Wide Web", undated.

House, "Spoken–language Access to Multimedia (SLAM)", Master's Thesis, Oregon Graduate Institute, undated.

*Primary Examiner*—Daniel S. Hunter
*Attorney, Agent, or Firm*—Skjerven, Morrill, MacPherson, Franklin & Friel, LLP; Stephen A. Terrile

[57] ABSTRACT

A method for accessing and browsing the internet through the use of a telephone and the associated DTMF signals is disclosed. The preferred embodiment provides a system that converts the information content of a web page from text to speech (voice signals), signals the hyperlink selections of a web page in an audio manner, and allows selection of the hyperlinks through the use of DTMF signals generated from a telephone keypad. Upon receiving a DTMF signal corresponding to a hyperlink, the corresponding web page is fetched and again delivered to the user via one of the available delivery methods such as voice, fax-on-demand, electronic mail, or regular mail.

68 Claims, 4 Drawing Sheets

Microfiche Appendix Included
(4 Microfiche, 46 Pages)

METHOD AND APPARATUS FOR TELEPHONICALLY ACCESSING AND NAVIGATING THE INTERNET

REFERENCE TO A MICROFICHE APPENDIX

A Microfiche Appendix conforming to the standards set forth in 35 CFR §1.96(c)(2) is attached. The Microfiche Appendix includes four microfiche including an Appendix A microfiche, an Appendix B microfiche, an Appendix C microfiche and an Appendix D microfiche. The Appendix A microfiche includes nine frames. The Appendix B microfiche includes four frames. The Appendix C microfiche includes four frames. The Appendix D microfiche includes 29 frames.

BACKGROUND OF THE INVENTION

1. Field of the Invention

The present invention relates generally to methods for retrieving information from an interconnected network and for accessing and delivering the retrieved information to a user, and, more particularly, a method for accessing and retrieving information from an interconnected networks such as the internet via a telephone in response to the user's request and for delivering the information via voice, fax-on-demand, email, and other means to the user.

2. Description of the Prior Art

Under the conventional method of accessing information on an interconnected network such as the internet, the user is required to have a certain amount of computer software and hardware and is expected to have a certain level of computer expertise before the user can successfully access (or browse) a wide range of information now available on the internet. If the user does not have the necessary hardware and the appropriate software to direct the computer to establish a connection to the internet via a modem or a direct connection to the internet, the user would then have no other means available to him or her for accessing the internet.

Given the amount of information now readily available on the internet, having the ability to access the internet becomes a matter of convenience as well as a matter of having access to an invaluable information source.

Additionally, from a company or an organization point of view, it is advantageous to direct customers to a centralized information database and thereby necessitating the maintenance of only one database rather than multiple databases.

The software and hardware requirement for accessing the internet creates a barrier for most people to take advantages of this information source. Prior art systems overcome this problem by providing a telephone fax-on-demand system where a user uses a telephone to dial into a company's web page and directs the system to fax the web page back to the user. However, the manner in operating this type of system is tedious and time consuming. In order for the user to access a hyperlink on the web page, the first web page needs to be faxed back to the user with the hyperlinks numerically annotated for reference. The user then calls a second time (or waits for the first fax page to arrive on another line) to access subsequent web pages numerically using the now numbered hyperlinks.

It is thus clear that a better system is needed to access and browse the internet in an inexpensive and efficient manner.

SUMMARY OF THE INVENTION

It is therefore an object of the present invention to provide a method for accessing and browsing the internet through the use of a telephone.

It is another object of the present invention to provide a method for accessing and browsing the internet by converting the information content of a web page to voice format.

It is yet another object of the present invention to provide a method for signaling the user in an audio manner the hyperlink selections in a web page.

It is yet another object of the present invention to provide a method for accessing and browsing the internet where the information content of a web page may be provided to the user via voice format, fax-on-demand, e-mail, or regular mail.

Briefly, a method for accessing and browsing the internet through the use of a telephone and the associated DTMF signals is disclosed. The preferred embodiment of the present invention provides a system that converts the information content of a web page from text to speech (voice signals), signals the hyperlink selections of a web page in an audio manner, and allows selection of the hyperlinks through the use of DTMF signals as generated from a telephone keypad. Upon receiving a DTMF signal corresponding to a hyperlink, the corresponding web page is fetched and again delivered to the user via one of the available delivery methods.

An advantage of the present invention is that it provides a method for accessing and browsing the internet through the use of a telephone.

Another advantage of the present invention is that it provides a method for accessing and browsing the internet by converting the information content of a web page to voice format.

Yet another advantage of the present invention is that it provides a method for signaling the user in an audio manner the hyperlink selections in a web page.

Yet another advantage of the present invention is that it provides a method for accessing and browsing the internet where the information content of a web page may be provided to the user via voice format, fax-on-demand, e-mail, or regular mail.

These and other objects and advantages of the present invention will no doubt become obvious to those of ordinary skill in the art after having read the following illustrations and detailed description of the preferred embodiments.

IN THE DRAWINGS

DETAILED DESCRIPTION OF THE PREFERRED EMBODIMENTS

Figure 1:
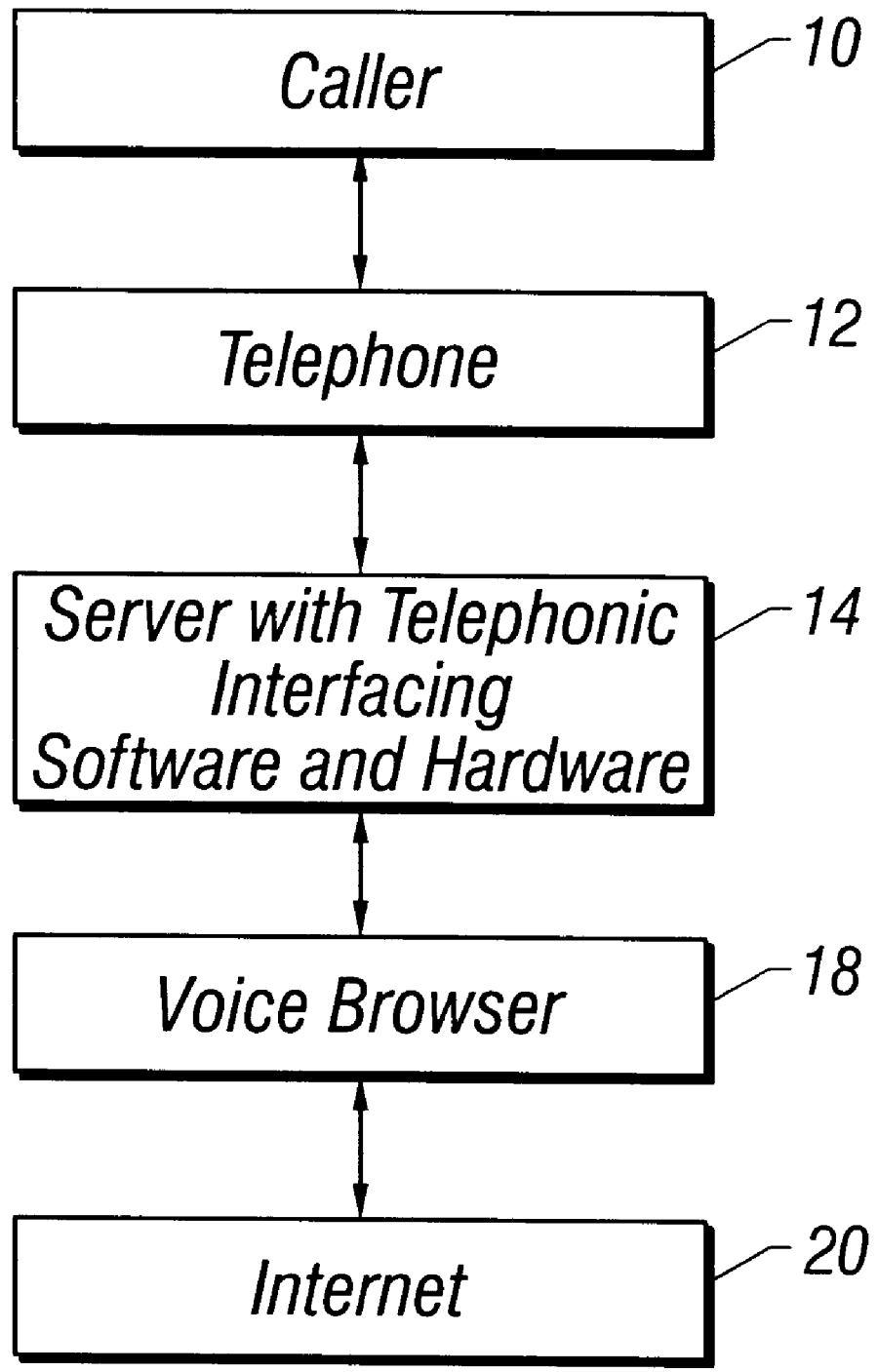
FIG. 1 illustrates the components of the preferred embodiment of the present invention.

Referring to FIG. 1, the preferred embodiment of the present invention is operated by a caller 10 using a telephone 12 to dial into a server having telephonic interfacing software and hardware. The server provides audio directions to the caller and provides a number of options which may be selected by the corresponding DTMF tones generated through the use of a telephone keypad. By pressing a number on the keypad corresponding to the desired option, the caller selects one of the several available options. The server then receives the DTMF tone, converts the tone to a corresponding DTMF code, identifies the option corresponding to the code, and executes the action corresponding to the selected option. In this manner, the caller is able to direct the server to take certain available actions.

One of the available actions is to direct a voice browser 18 to navigate the internet 20. By selecting the voice browser, the caller is provided with an audio readback of a default web page where the available links to other web pages are read back to the user and are indicated by a special audio signal such as a short duration tone signal, a beep, a "bong" sound, etc.

For example, referring to Appendix D illustrating a listing of the code of the preferred embodiment as described below, instructions (starting from page 13 of Appendix D) are provided to direct a user to navigate through available documents and the hyperlinks therein. By repetitively selecting documents and the hyperlinks contained therein, the user can navigate the entire internet.

User Interface for Operating the Voice Web

To operate the preferred embodiment of the present invention, a touch-tone phone and the phone number to access a server are all that is required.

The voice browser provides a series of audio menus to guide the caller to retrieve documents or web pages from the internet. Several options are provided at each menu and the caller may make a selection by pressing the corresponding key(s) on the telephone. The opening menu may request a password before allowing the caller to access the system.

For inputs requiring specific spelling of the information being entered (e.g. e-mail address, name, street address, etc.), each character can be defined by pressing a two-key combination. The first key indicates the key where the letter appears, and the second key indicates the position it occurs on that key. For example, the letter "A" is defined as 21, "B" is defined as 22, "C" is defined as 23, "D" is defined as 31, etc. However, the letters "Q" and "Z" are not defined on a telephone keypad and they may be assigned by special two-key combinations. In the preferred embodiment, the letter "Q" is defined as 17 and the letter "Z" is defined as 19. Other special characters may be assigned as well. For example the "@" sign is defined as 12, the "_" character is defined as 18, the "." (period) is defined as 13, and a "" (space) is defined as 11.

The actual interface between the voice browser and the telephony interfacing hardware is expected to vary according to the implementation. There are two issues involved here. One issue involves interface control, namely how the software commands are accepted by the interface and how errors or exceptions are signaled. The other issue involves audio encoding—how audio (e.g. voice) data is represented at the interface. For example, the Rockwell chip set utilizes a Hayes-compatible command set which is extended for fax and voice operations, and audio data is encoded in the Adaptive Differential Pulse Coded Modulation (ADPCM) format. Under a Unix system, ioctl() commands may be used to manipulate the audio interface. There may be another protocol for ISDN lines as well.

Voice Web

Figure 2:
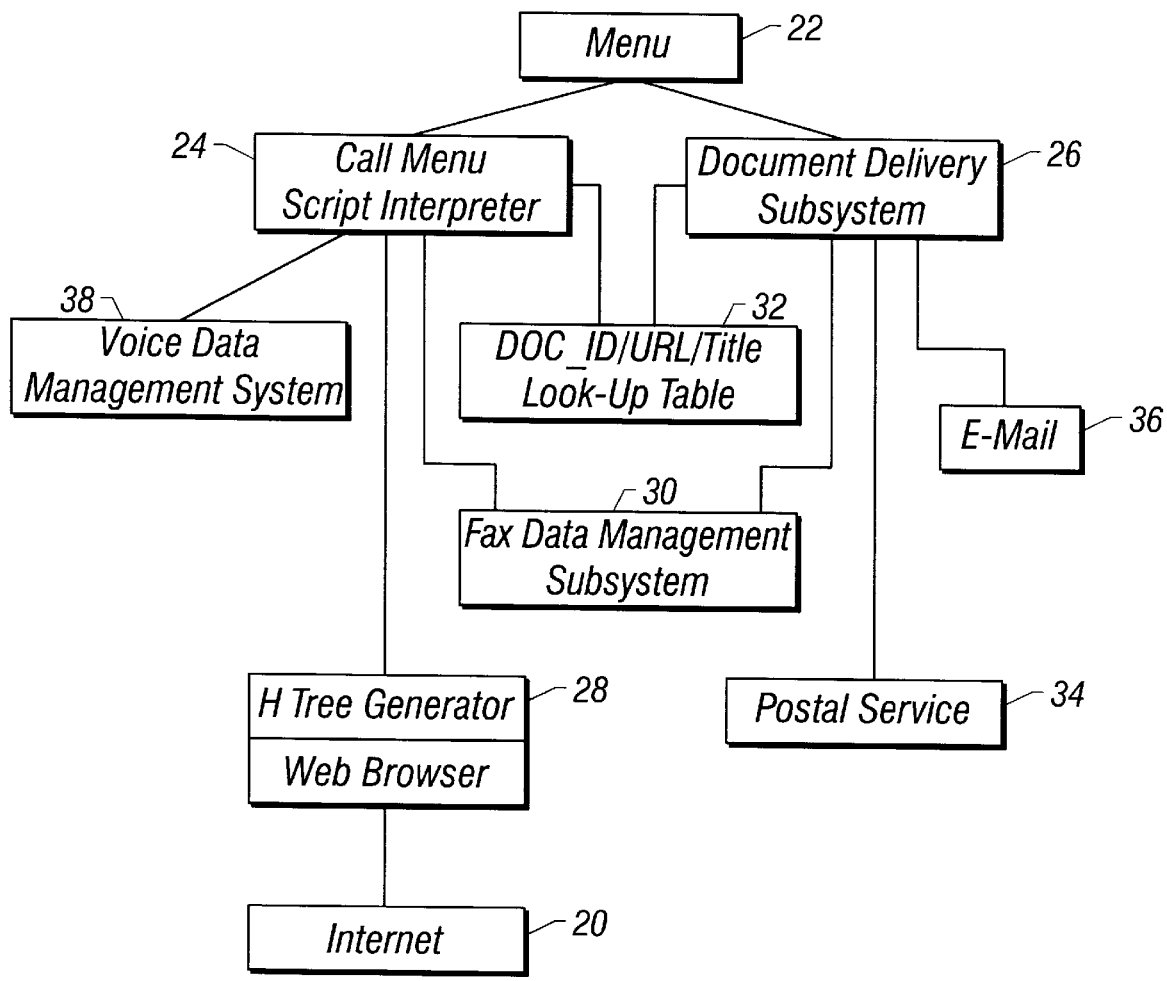
FIG. 2 shows the subsystems for the voice browser of the present invention.

Referring to FIG. 2, the voice browser is software driven and is composed of several cooperating subsystems. From the main engine 22, depending on the selection made or the scheduling algorithm, either the Call Menu Script Interpreter 24 or the document delivery subsystem 26 may be activated.

The Call Menu Script Interpreter (CMSI) guides a caller through a series of call menus and plays voice segments of retrieved web pages or documents to the caller. It responds to the caller's touch tone selection and drives the HTree Generator/Web Browser 28. The task is accomplished by first directing the web browser to retrieve the desired web page(s) from the internet. The HTree Generator then converts the retrieved web page into an HTree which is a data structure storing web page data in a particular format conducive for conversion into voice format. The CMSI then traverses the HTree, sending HTree segments to the Voice Data management Subsystem (voice DMS) 38. The Voice DMS contains pre-recorded texts or text-strings. For the texts or text-strings not in the Voice DMS, a text-to-speech engine is provided to convert the text to speech. The information content of the web page is then delivered to the caller in the voice format. Optionally, the web page can also be delivered to the caller in other available methods, or it can be marked as a document request job for later processing. If the caller is calling from a phone line connected to a fax machine, the web page can be immediately delivered to the caller via the fax machine.

The web browser 28 of the preferred embodiment is a general web browser modified to interface with the HTree Generator and to access the internet 20. The web page or documents that may be readily accessed by the caller are indexed by document-ID, title, or Universal Resource Locator (URL) and stored in a database.

The document delivery subsystem 26 responds to the several available methods for delivering the web page to the caller. These methods include delivery via fax, electronic mail, and regular postal mail. The document delivery subsystem 26 also may directly retrieve a web page as selected by a caller and deliver the information to the caller via one of the available delivery methods.

In the case of delivery by fax, the documents may be directly retrieved by a Fax Data Management Subsystem (Fax DMS) where the web pages in the HTML format may be converted to the PostScript format and then from the PostScript format to TIFF image format.

In the case of delivery by e-mail, documents may be directly retrieved by an E-Mail Data Management Subsystem where web pages in the HTML format may be converted to straight ASCII text or to the PostScript format.

Call Menu Script Interpreter

The Call Menu Script Interpreter (CMSI) guides the caller through a series of call menus via voice prompts and plays voice segments of a retrieved web page to the caller. The caller interacts with the CMSI by generating DTMF tones from the caller's touch-tone keypad. The DTMF tones are converted into ASCII text usually by the telephony interface hardware. In one embodiment, the conversion from DTMF tones to ASCII text is performed by a voice modem.

In order to carry out all of the tasks, the CMSI is implemented utilizing a set of software registers and instructions. A software register may be readable, writable, markable, or nav-writable where a nav-writable register allows the navigational mechanism of the browser to write to it. Registers which can be written by the DTMF-converted ASCII text are referred to as "caller-writable registers." These registers include the DocID, FaxNum, ExtNum, ExtName, Passwd, Userid, and Selection registers. Registers for which the ASCII text can be converted into voice are termed "caller-readable registers". These registers include the DocId, FaxNum, ExtNum, ExtName, and Title registers. Markable registers include the DocId and URL registers. The nav-writable registers include the DocId, URL, Title, MarkedNumDoc, MaxNumDoc, and MaxRepeatInput registers.

There is also an instruction set associated with the registers. There are four basic categories of instructions: Execution Control instructions, Caller Register instructions, Audio Output instructions, and Miscellaneous instructions. Some of the more basic instructions are the Play instruction which plays the content of a register, a prompt, or a web page; the Get instruction which gets the DTMF input into a register; the Mark instruction which marks a page or document according to a URL or DocId; the Goto instruction which unconditionally jumps to a different location in the script; and the Selection instruction which jumps if a given register matches a given DTMF string. Appendix A attached herein explains each of the registers and instructions. The preferred embodiment is not limited to the listed registers and instructions in Appendix A. New instructions and/or registers can be readily added to accommodate new features or functionalities.

As the caller navigates through the web, a URL list is kept. A maximum size limit is imposed on the URL list where a First-In-First-Out system is maintained. Additionally, each URL entry in the URL list may have an associated HTree. There is an HTree cache for all the HTree entries. For the HTree cache, if there is a limitation in size, the least recently used entry is deleted first.

HTree Generator/Web Browser

Figure 3:
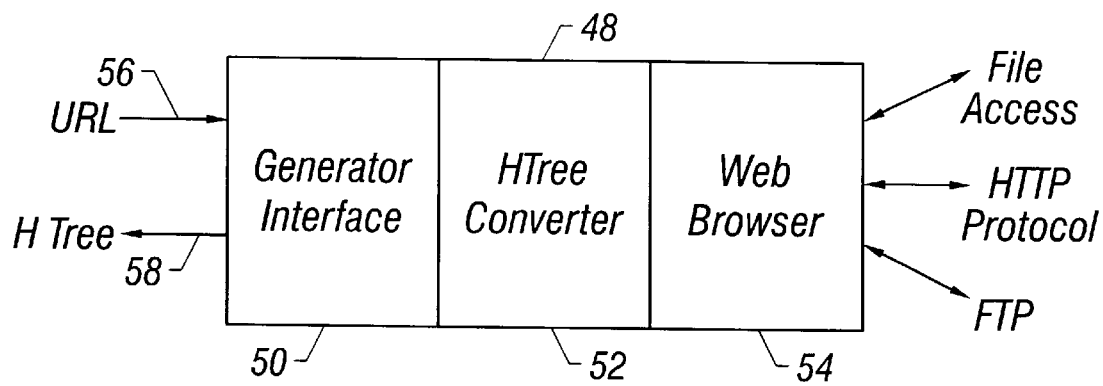
FIG. 3 illustrates the subsystems of the HTree Generator/Web browser.

The HTree Generator/Web Browser (hereinafter "HTree Generator") is the Voice Browser's agent for accessing the World-Wide-Web. It is similar to a GUI-based web browser except that the user interface is replaced by an audio interface residing within the CMSI. The HTree Generator is driven by the CMSI. Referring to FIG. 3, the HTree Generator 28 is generally comprised of a generator interface component 50, an HTree Converter 52, and a web browser 54. The CMSI sends a URL 56 to the HTree Generator 28. The generator interface 50 receives the URL and sends the URL to the web browser 54 to retrieve the web page or document via one of the several available methods (e.g. FTP and HTTP). The HTree Converter 52 converts the retrieved web page/document into an HTree, and the HTree is sent to the CMSI. Thus, regardless of the format of the retrieve document, it can be converted into HTree format for processing.

At its highest level, an HTree contains a series of HTree sentences. An HTree sentence can comprise several HTree segments which when strung together forms a complete sentence in the language of choice including English and Spanish. The top level structure, represented by the symbol _HTree, represents a given web page where the structure may include the URL of the page, its title, and it may include a number of linked lists. Appendix B attached herein provides a full explanation of the HTree structure.

Voice Data Management Subsystem

Figure 4:
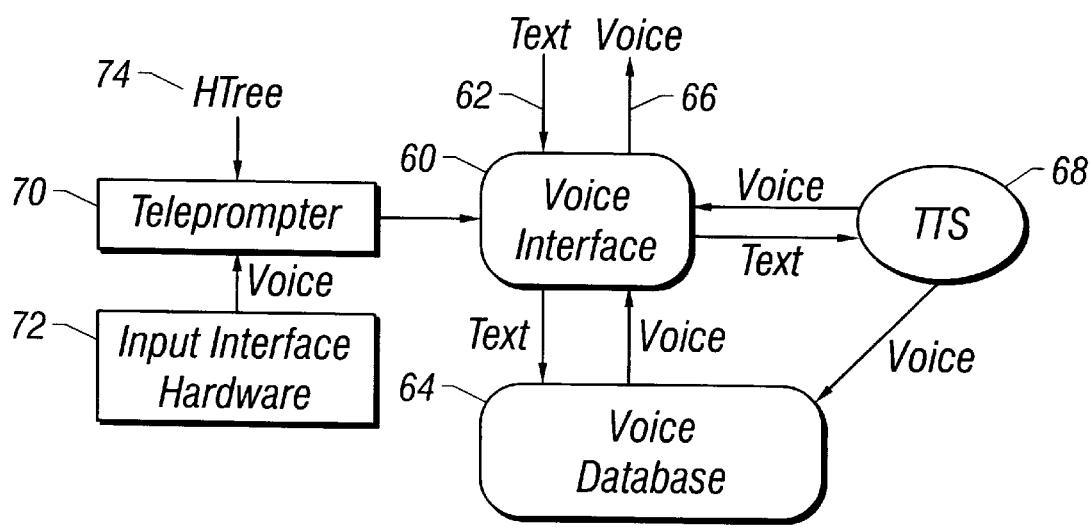
FIG. 4 shows the components of the Voice Data Management System.

The Voice Data Management Subsystem (Voice DMS) provides audio segments to the CMSI for the given text segments. Referring to FIG. 4, the main interface between the Voice DMS and the CMSI is the voice interface 60. The voice interface 60 receives a text string from the CMSI and passes it to the Voice database 64 to retrieve the corresponding digitally encoded voice pattern. The voice interface 60 then returns the encoded voice pattern 66 to the CMSI. If the voice interface does not find the text string in the Voice database, it will send the text string to the Text-To-Speech subsystem 68 to generate the digitally encoded voice pattern for that text string. The generated voice pattern is passed to the voice interface to pass to the CMSI. Whenever the Text-To-Speech subsystem generates a voice pattern for a text string, the text string and the generated voice pattern is passed to the Voice database and stored for future reference.

Some of the voice interface's functions for driving the application program interface (API) include voiceopen, voiceget and voiceclose. The voiceopen function creates a voice handle for a given URL that enables the CMSI to keep track of the data during a session. The voiceget operation uses the voice handle to retrieve a voice pattern. The voiceclose function simply closes the interface associated with a voice handle.

Commonly used text strings may be recorded with human voice. A method of inputting text strings and associated human voice into the voice database involves the using of a voice teleprompter 70 and input interface hardware 72. Some of the capabilities that the teleprompter include Play, Start, Stop, and Record. The voice teleprompter 70 receives an HTree as input 74 and displays HTree segments on the teleprompter 70. A person whose voice is being recorded would read the text strings as displayed by the teleprompter 70 and use the input interface hardware 72 to input his or her voice. Once the recording is satisfactory, the teleprompter sends the recording along with the text string to the voice interface 60 for storage into the voice database 64.

Document Delivery Subsystem

The Document Delivery Subsystem provides a method for the caller to request a document or a web page to be delivered via one of the available delivery methods such as delivery via fax, via e-mail, or via regular postal service.

In delivering a document or web page via e-mail, the document or web page may be formatted for ASCII, a selected word processing program format, or another available format. In delivering a document or web page via regular postal mail, the system will ask for the caller's name and address if it is not already in a caller information database.

In delivering a document or web page via fax, once the TIFF files for all the requested documents have been retrieved or received, the files are concatenated into one file and queued for transmission. The fax can be sent to the caller right away if the caller has another phone line connected to a fax machine.

The document delivery subsystem operates like a queue where the queue is periodically check to see if there are any pending jobs. If there is a pending job, a scheduling file that contains the time for delivery, the method of delivery, and the file for delivery for each job is checked. If the transmission attempt is unsuccessful, the job will be rescheduled for transmission at a later time. There is a limit on the number of retries before the system administrator is notified. Appendix C attached herein provides the specific details for the document delivery subsystem.

Fax Data Management Subsystem

Figure 5:
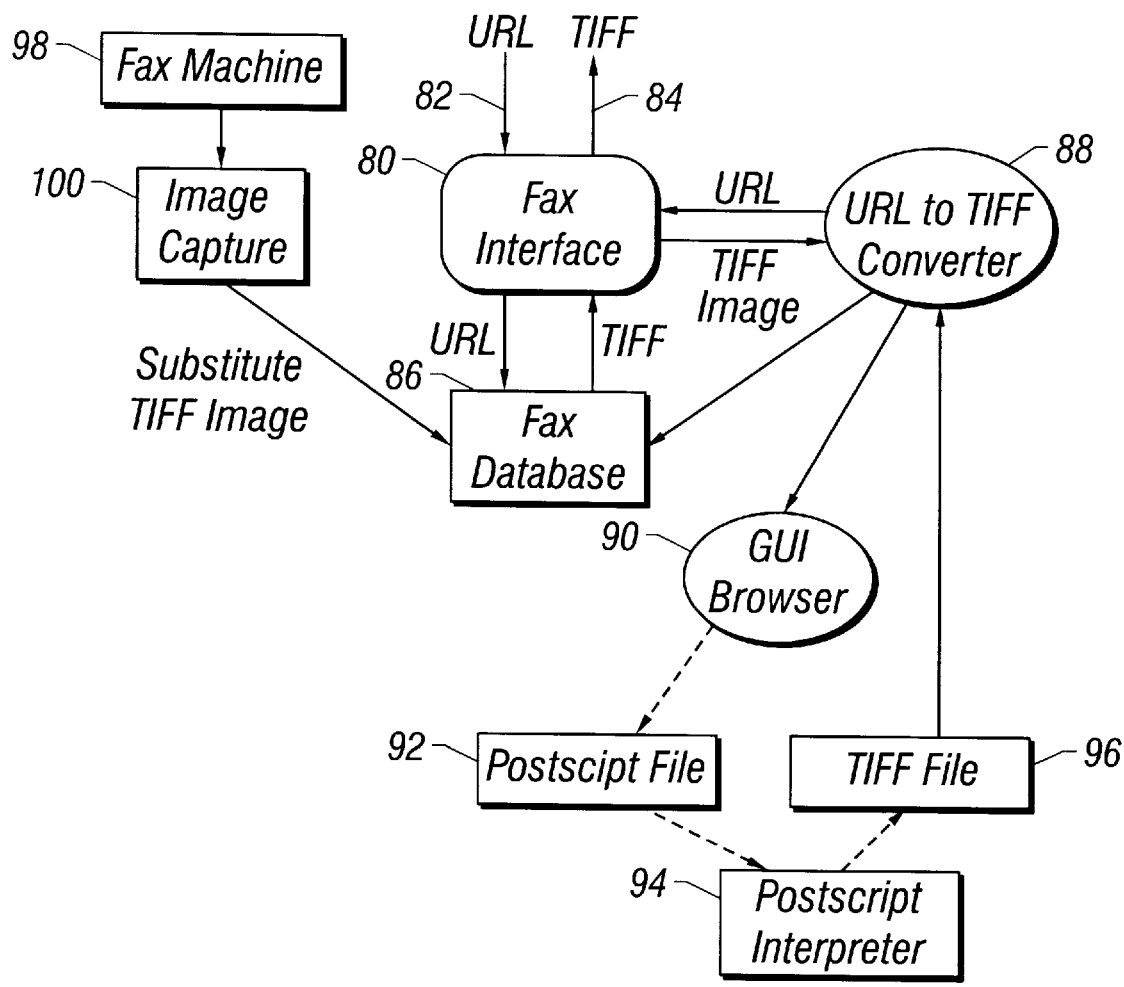
FIG. 5 illustrates the components of the Fax Data Management System.

The Fax Data Management Subsystem (Fax DMS) interacts with the CMSI and Document Delivery Subsystem through an interface called the fax interface. Referring to FIG. 5, the fax interface 80 receives a URL 82 and returns a TIFF formatted file 84. The fax interface 80 searches the Fax database 86 for the corresponding TIFF file for the given URL. If a TIFF file is found, the fax interface retrieves the file and returns it to the requesting subsystem. If the requested file is not found in the Fax database, the fax interface sends the URL to a URL-To-TIFF convertor 88. The TIFF converter invokes a GUI browser 90 to retrieve the web page or document if it has not already been retrieved and uses the browser to convert the web page or document into a PostScript formatted file 92. The PostScript formatted file is then passed to a PostScript interpreter 94 which creates a TIFF file 96 from the PostScript file. The TIFF file is then passed back to the fax interface 80 and/or a fax database 86. Fax images can also be directly imported into the fax database through the use of a fax machine which creates an image capture file 100 for import into the fax database. The image capture file 100 ensures the quality of an image and may compare favorably against TIFF formatted images.

Although the present invention has been described in terms of the presently preferred embodiment, it is to be understood that such disclosure is not to be interpreted as limiting. Various alterations and modifications will no doubt become apparent to those skilled in the art after reading the above disclosure. Accordingly, it is intended that the appended claims be interpreted as covering all alterations and modifications as fall within the true spirit and scope of the invention.

What we claim is:

1. A method for telephonically accessing and navigating a computer network, the method comprising:

receiving a first request transmitted from a telephone, the first request comprising data signals that correspond to a first unique address of a first data file residing on the computer network, and the first data file comprising a first hyperlink;

transmitting a first response to the telephone, the first response comprising voice signals that correspond to text stored in the first data file the first data file corresponding to a Hyper Text Mark-up Language (HTML) format; and, converting the first data file to a first format, the first format including an H-tree data structure.

2. The method as recited in claim 1 wherein the first hyperlink corresponds to a second unique address of a second data file residing on the computer network.

3. The method as recited in claim 1 wherein the computer network comprises the Internet.

4. The method as recited in claim 1 wherein the first data file resides on a first computer of the computer network, and the first hyperlink corresponds to a second unique address of a second data file residing on a second computer of the computer network.

5. The method as recited in claim 1 wherein the data signals comprise Dual Tone Multiple Frequency (DTMF) signals.

6. The method as recited in claim 1 wherein the voice signals comprise synthesized voice signals.

7. The method as recited in claim 1 wherein the voice signals comprise recorded voice signals.

8. The method as recited in claim 1 further comprising:

receiving a second request transmitted from the telephone, the second request comprising data signals that correspond to a second unique address of a second data file residing on the computer network, and the second unique address corresponding to the first hyperlink of the first data file.

9. The method as recited in claim 8 wherein the first data file comprises a Hyper Text Mark-up Language (HTML) format.

10. The method as recited in claim 1 further comprising:

transmitting predetermined signals to the telephone, the predetermined signals indicating the first hyperlink.

11. The method as recited in claim 10 wherein the predetermined signals comprise a predetermined tone.

12. The method as recited in claim 1 further comprising:

fetching the first data file using a Hyper Text Transfer Protocol (HTTP).

13. The method as recited in claim 1 wherein the voice signals comprise a verbal reading of the first unique address.

14. The method as recited in claim 1 further comprising:

receiving a facsimile request transmitted from the telephone, the facsimile request indicating a request for a copy of the first data file transmitted via facsimile; and transmitting a facsimile response, the facsimile response comprising the first data file transmitted via facsimile.

15. The method as recited in claim 14 further comprising:

converting the first data file from a Hyper Text Mark-up Language (HTML) format to a first format.

16. The method as recited in claim 15 wherein the first format comprises a PostScript format.

17. The method as recited in claim 15 further comprising:

converting the first data file from the first format to a second format, the second format comprising a Tagged Image File Format (TIFF).

18. The method as recited in claim 1 further comprising:

receiving an electronic mail request transmitted from the telephone, the electronic mail request indicating a request for an electronic copy of the first data file transmitted via electronic mail; and transmitting an electronic mail message, the electronic mail message comprising the first data file.

19. The method as recited in claim 1 further comprising:

receiving a postal mail request transmitted from the telephone, the postal mail request indicating a request for a printed copy of the first data file; and transmitting a postal mail message, the postal mail message comprising the first data file in a paper-based document format.

20. The method as recited in claim 1 wherein the voice signals comprise recorded voice signals that correspond to the text stored in the first data file, the recorded voice signals being stored in a voice database.

21. A method for telephonically accessing and navigating a computer network, the method comprising:

receiving a first request transmitted from a telephone, the first request comprising data signals that correspond to a first unique address of first data file residing on the computer network, and the first data file comprising a first hyperlink;

transmitting a first response to the telephone, the first response comprising voice signals that correspond to text stored in the first data file;

fetching first data file using the first unique address, the first data file comprising a Hyper Text Mark-up Language (HTML) format, and the first unique address comprising a Universal Resource Locator (URL) the fetching step including a Hyper Text Transfer Protocol (HTTP) request transmitted via the Internet, and the URL including an address of a first computer in communication with the Internet; and, converting the first data file to an H-tree data structure.

22. The method as recited in claim 21 further comprising:

generating the voice signals that correspond to the text stored in the first data file; and generating predetermined signals preceding the first hyperlink to indicate the first hyperlink.

23. The method as recited in claim 22 wherein the generating the voice signals step comprises:

outputting recorded voice signals, the recorded voice signals being stored in a voice database.

24. The method as recited in claim 23 wherein the generating speech signals step further comprises:

outputting text-to-speech synthesized voice signals, the text-to-speech synthesized voice signals being generated by a text-to-speech voice synthesizer.

25. The method as recited in claim 22 further comprising:

receiving a second request transmitted from the telephone, the second request comprising DTMF signals that correspond to the first hyperlink; and transmitting a second response to the telephone, the second response comprising voice signals that correspond to text stored in the second data file, and the second data file comprising a second hyperlink.

26. The method as recited in claim 25 wherein the first data file comprises a first Web page, and the second data file comprises a second Web page.

27. The method as recited in claim 25 further comprising:

inputting recorded speech in the voice database using a teleprompter.

28. The method as recited in claim 25 wherein the fetching step comprises:

requesting a Web page corresponding to the first unique address using a Web browser.

29. The method as recited in claim 28 further comprising:

converting the first data file to a Tagged Image File Format (TIFF); and transmitting the converted first data file via facsimile.

30. The method as recited in claim 28 further comprising:

converting the first data file to a paper-based document format; and mailing the converted first data file via postage mail.

31. The method as recited in claim 28 further comprising:

converting the first data file to an ASCII format; and transmitting an electronic mail message, the electronic mail message comprising the converted first data file.

32. The method as recited in claim 28 wherein the predetermined signals comprise a numeric voice message.

33. The method as recited in claim 28 wherein the voice signals are encoded in Adaptive Differential Pulse Coded Modulation format.

34. The method as recited in claim 28 further comprising:

generating text-to-speech synthesized voice signals that correspond to the text stored in the first data file if recorded speech corresponding to the text stored in the first data file is not stored in the voice database; and storing the generated text-to-speech synthesized voice signals in the voice database for subsequent lookup.

35. An apparatus for telephonically accessing and navigating a computer network, the apparatus comprising:

logic that receives a first request transmitted from a telephone, the first request comprising data signals that correspond to a first unique address of a first data file residing on the computer network and the first data file comprising a first hyperlink, the first data file comprising a Hyper Text Mark-up Language (HTML) format;

logic that transmits a first response to the telephone, the first response comprising voice signals that correspond to text stored in the first data file;

logic that converts the first data file to a first format, the first format including an H-tree data structure.

36. The apparatus as recited in claim 35 wherein the first hyperlink corresponds to a second unique address of a second data file residing on the computer network.

37. The apparatus as recited in claim 35 wherein the computer network comprises the Internet.

38. The apparatus as recited in claim 35 wherein the first data file resides on a first computer of the computer network, and the first hyperlink corresponds to a second unique address of a second data file residing on a second computer of the computer network.

39. The apparatus as recited in claim 35 wherein the data signals comprise Dual Tone Multiple Frequency (DTMF) signals that correspond to the first unique address.

40. The apparatus as recited in claim 35 wherein the voice signals are generated using a voice interface that outputs synthesized voice signals.

41. The apparatus as recited in claim 35 wherein the voice signals are generated using a voice interface that outputs recorded voice signals.

42. The apparatus as recited in claim 35 further comprising:

logic that receives a second request transmitted from the telephone, the second request comprising data signals that correspond to a second unique address of a second data file residing on the computer network, and the second unique address corresponding to the first hyperlink of the first data file.

43. The apparatus as recited in claim 42 wherein the first data file comprises a Hyper Text Mark-up Language (HTML) format.

44. The apparatus as recited in claim 35 further comprising:

logic that transmits predetermined signals to the telephone, the predetermined signals indicating the first hyperlink.

45. The apparatus as recited in claim 44 wherein the predetermined signals comprise a predetermined tone.

46. The apparatus as recited in claim 35 further comprising:

logic that fetches the first data file using a Hyper Text Transfer Protocol (HTTP).

47. The apparatus as recited in claim 35 wherein the voice signals comprise a verbal reading of the first unique address.

48. The apparatus as recited in claim 35 further comprising:

logic that receives a facsimile request transmitted from the telephone, the facsimile request indicating a request for a copy of the first data file transmitted via facsimile; and logic that transmits a facsimile response, the facsimile response comprising the first data file transmitted via facsimile.

49. The apparatus as recited in claim 48 further comprising:

logic that converts the first data file from a Hyper Text Mark-up Language (HTML) format to a first format.

50. The apparatus as recited in claim 49 wherein the first format comprises a PostScript format.

51. The apparatus as recited in claim 50 further comprising:

logic that converts the first data file from the first format to a second format, the second format comprising a Tagged Image File Format (TIFF).

52. The apparatus as recited in claim 35 further comprising:

logic that receives an electronic mail request transmitted from the telephone, the electronic mail request indicating a request for an electronic copy of the first data file transmitted via electronic mail; and logic that transmits an electronic mail message, the electronic mail message comprising the first data file.

53. The apparatus as recited in claim 35 further comprising:

logic that receives a postal mail request transmitted from the telephone, the postal mail request indicating a request for a printed copy of the first data file; and logic that transmits a postal mail message, the postal mail message comprising the first data file in a paper-based document format transmitted via postal mail.

54. The apparatus as recited in claim 35 wherein the voice signals comprise recorded voice signals that correspond to the text stored in the first data file, the recorded voice signals being stored in a voice database.

55. An apparatus for telephonically navigating a computer network, the apparatus comprising:

logic that receives a first request transmitted from a telephone, the first request comprising data signals that correspond to a first unique address of a first data file residing on the computer network, and the first data file comprising a first hyperlink; and logic that transmits a first response to the telephone, the first response comprising voice signals that correspond to text stored in the first data file;

a Web browser, the Web browser fetching the first data file using the first unique address, the fist data file comprising a Hyper Text Mark-up Language (HTML) format, and the fist unique address comprising a Universal Resource Locator (URL), the Web browser transmits a Hyper Text Transfer Protocol (HTTP) request transmitted via the Internet, and the URL including an address of a first computer in communication with the Internet;

an H-tree converter, the H-tree converter converting the first data file to an H-tree data structure.

56. The apparatus as recited in claim 55 further comprising:

a voice interface, the voice interface generating voice signals that correspond to the text stored in the first data file, and the voice interface generating predetermined signals preceding the first hyperlink to indicate the first hyperlink.

57. The apparatus as recited in claim 56 further comprising:

a voice database, the voice database storing recorded voice signals, and the voice interface outputting voice signals stored in the voice database that correspond to the text stored in the first data file.

58. The apparatus as recited in claim 57 further comprising:

a text-to-speech voice synthesizer, the text-to-speech voice synthesizer generating text-to-speech synthesized voice signals, and the voice interface outputting text-to-speech generated voice signals that correspond to the text stored in the first data file.

59. The apparatus as recited in claim 56 further comprising:

logic that receives a second request transmitted from the telephone, the second request comprising DTMF signals that correspond to the first hyperlink; and logic that transmits a second response to the telephone, the second response comprising voice signals that correspond to text stored in the second data file, and the second data file comprising a second hyperlink.

60. The apparatus as recited in claim 59 wherein the first data file comprises a first Web page, and the second data file comprises a second Web page.

61. The apparatus as recited in claim 59 further comprising:

a teleprompter, the teleprompter being used to input recorded speech in the voice database.

62. The apparatus as recited in claim 59 wherein the Web browser requests a Web page that corresponds to the first unique address.

63. The apparatus as recited in claim 62 further comprising:

a Tagged Image File Format (TIFF) converter, the TIFF converter converting the first data file to a TIFF file; and logic that transmits the converted first data file via facsimile.

64. The apparatus as recited in claim 63 further comprising:

a document delivery sub-system, the document delivery sub-system converting the first data file to a paper-based document format for mailing via postage mail.

65. The apparatus as recited in claim 63 further comprising:

a document delivery sub-system, the document delivery sub-system converting the first data file to an ASCII format; and an electronic mail sub-system, the electronic mail sub-system transmitting an electronic mail message, and the electronic mail message comprising the converted first data file.

66. The apparatus as recited in claim 63 wherein the predetermined signals comprise a numeric voice message.

67. The apparatus as recited in claim 63 wherein the voice signals are encoded in Adaptive Differential Pulse Coded Modulation format.

68. The apparatus as recited in claim 63 further comprising:

a text-to-speech synthesizer, the text-to-speech synthesizer generating text-to-speech synthesized voice signals that correspond to the text stored in the first data file if recorded speech corresponding to the text stored in the first data file is not stored in the voice database; and logic that stores the generated text-to-speech synthesized voice signals in the voice database for subsequent lookup.

* * * * *